(12) United States Patent
Stone et al.

(10) Patent No.: US 6,728,834 B2
(45) Date of Patent: Apr. 27, 2004

(54) SYSTEM AND METHOD FOR EFFECTIVELY IMPLEMENTING ISOCHRONOUS PROCESSOR CACHE (75) Inventors: Glen D. Stone, Los Gatos, CA (US); Scott D. Smyers, San Jose, CA (US); Bruce A. Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/352,260

(22) Filed: Jan. 27, 2003

(65) Prior Publication Data
US 2003/0115430 A1 Jun. 19, 2003

Related U.S. Application Data

(63) Continuation of application No. 09/606,813, filed on Jun. 29, 2000, now Pat. No. 6,578,109.

(51) Int. Cl.[7] .............................................. G06F 12/00
(52) U.S. Cl. .................. 711/118; 711/158; 711/100; 711/117; 710/315; 710/21; 709/225; 709/203; 370/395.61; 370/503; 345/501; 345/520; 345/531
(58) Field of Search ........................ 711/100, 111, 711/112, 119–120, 126, 132, 144, 145, 158, 173, 118; 709/203, 225; 710/315, 21, 310, 29, 52; 370/503, 465, 395.61; 345/501, 520, 531

(56) References Cited

U.S. PATENT DOCUMENTS

| 5,640,392 A | * | 6/1997 | Hayashi ....................... 370/465 |
| 6,101,613 A | * | 8/2000 | Garney et al. ............... 713/600 |
| 6,260,119 B1 | * | 7/2001 | Garney et al. ............... 711/150 |
| 6,415,367 B1 | * | 7/2002 | Baxter et al. ................ 711/158 |
| 6,438,604 B1 | * | 8/2002 | Kuver et al. ................. 709/234 |

* cited by examiner

*Primary Examiner*—Matthew Kim
*Assistant Examiner*—Zhuo H. Li
(74) *Attorney, Agent, or Firm*—Gregory J. Koerner; Simon & Koerner LLP (57) ABSTRACT

A system and method for effectively implementing isochronous processor cache comprises a memory device for storing high-priority isochronous information, an isochronous cache coupled to the memory device for locally caching the isochronous information from the memory device, and a processor device for accessing and utilizing the isochronous information that is stored in the isochronous cache. The isochronous cache is reserved for storing the isochronous information, and may be reconfigured into a selectable number of cache channels of varying size that each corresponds to an associated isochronous process.

21 Claims, 10 Drawing Sheets

SYSTEM AND METHOD FOR EFFECTIVELY IMPLEMENTING ISOCHRONOUS PROCESSOR CACHE

CROSS-REFERENCE TO RELATED APPLICATIONS

This application is a continuation and relates to, and claims priority in, U.S. patent application Ser. No. 09/606,813, now U.S. Pat. No. 6,578,109, issued on Jun. 10, 2003, entitled "System And Method For Effectively Implementing Isochronous Processor Cache," filed on Jun. 29, 2000. The foregoing related application is commonly assigned, and is hereby incorporated by reference.

BACKGROUND SECTION

1. Field of the Invention

This invention relates generally to techniques for optimizing processor operations, and relates more particularly to a system and method for effectively implementing isochronous processor cache.

2. Description of the Background Art

Implementing effective methods for optimizing processor operations is a significant consideration for designers and manufacturers of contemporary electronic devices. A processor in an electronic network may advantageously communicate with other electronic devices in the network to share data to thereby substantially increase the capabilities and versatility of individual devices in the electronic network. For example, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Effectively managing processor operations in a network of electronic devices may create substantial challenges for designers of electronic networks. For example, enhanced demands for increased device functionality and performance during data transfer operations may require more system processing power and require additional hardware resources across the network. An increase in processing or hardware requirements may also result in a corresponding detrimental economic impact due to increased production costs and operational inefficiencies.

Furthermore, enhanced device capability to perform various advanced processor operations may provide additional benefits to a system user, but may also place increased demands on the control and management of the various devices in the electronic network. For example, an enhanced electronic network that effectively accesses, processes, and displays digital television programming may benefit from efficient processing techniques because of the large amount and complexity of the digital data involved.

One type of processing that may occur in an electronic network is an isochronous process. Isochronous processes include the guaranteed handling of data that arrives in a time-based stream at regular intervals called cycles. Isochronous processes are typically used for time-sensitive applications. For example, video or audio data being transmitted across a network typically needs to arrive at a display device in an uninterrupted flow with appropriate timing.

Due to growing demands on system resources and substantially increasing data magnitudes, it is apparent that developing new and effective methods for optimizing processor operations is a matter of significant concern for the related electronic technologies. Therefore, for all the foregoing reasons, implementing effective methods for optimizing and facilitating processor operations remains a significant consideration for designers, manufacturers, and users of contemporary electronic devices.

SUMMARY

In accordance with the present invention, a system and method are disclosed for effectively implementing isochronous processor cache. In one embodiment, a computer device includes a central processing unit (CPU), a memory device, and a system bus that is isolated from an I/O bus by an I/O bus bridge. In practice, various types of information and data (including isochronous data) are preferably transferred bidirectionally by the computer device between the memory device and the I/O bus via the system bus and the I/O bus bridge.

In addition, the computer device preferably includes a cache memory that communicates bidirectionally with the memory device and the I/O bus bridge via the system bus. The cache memory also communicates bidirectionally with the CPU via a CPU bus. In other embodiments, the cache memory may alternately be implemented using various other appropriate configurations and architectures.

In certain embodiments, the cache memory may include an asynchronous cache for temporarily storing asynchronous data from various sources. In accordance with the present invention, the cache memory also preferably includes an isochronous cache that may advantageously be locked from access by other types of data transfers. The isochronous cache may also be flexibly reconfigured with regards to various selectable attributes such as data size and the number of different isochronous processes that are supported.

Isochronous data typically is time-sensitive data that is assigned a high transfer and processing priority to guarantee that the isochronous data deterministically arrives at predetermined timing intervals and is processed accordingly. Ensuring the timely and guaranteed arrival of isochronous data at the CPU becomes a matter of some significance when implementing the computer device. The computer device may therefore flexibly reserve a re-configurable portion of the cache memory as the isochronous cache to ensure deterministic performance of isochronous processes, in accordance with the present invention. The present invention thus provides an improved system and method for effectively implementing isochronous processor cache to optimize processor operations.

DETAILED DESCRIPTION

The present invention relates to an improvement in electronic devices. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for effectively implementing isochronous processor cache, and includes a memory device for storing high-priority isochronous information, an isochronous cache coupled to the memory device for locally caching the isochronous information from the memory device, and a processor device for accessing and utilizing the isochronous information that is stored in the isochronous cache. The isochronous cache is reserved for storing the isochronous information, and may be reconfigured into a selectable number of cache channels of varying size that each corresponds to an associated isochronous process.

Figure 1:
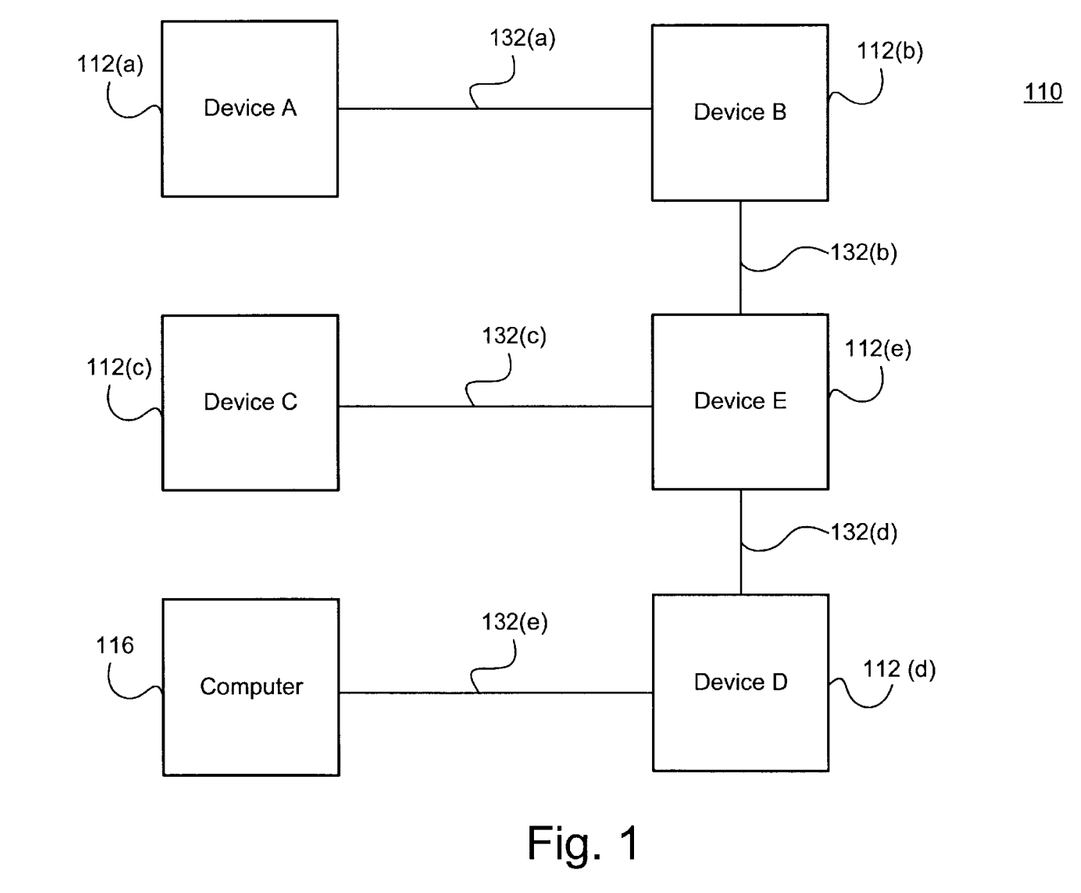
FIG. 1 is a block diagram for one embodiment of an electronic network, in accordance with the present invention.

Referring now to FIG. 1, a block diagram for one embodiment of an electronic network 110 is shown, according to the present invention. In the FIG. 1 embodiment, network 110 preferably comprises, but is not limited to, a number of electronic devices (device A 112(a), device B 112(b), device C 112(c), device D 112(d), and device E 112(e)), and computer 116. In alternate embodiments, electronic network 110 may readily be configured to include various other devices or components in addition to, or instead of, those discussed in conjunction with the FIG. 1 embodiment. In alternate embodiments, network 110 may readily be connected and configured in any other appropriate and suitable manner.

In the FIG. 1 embodiment, devices 112 and computer 116 of network 110 may alternately be implemented as any type of electronic device, including, but not limited to, personal computers, printers, digital video disc devices, television sets, audio systems, video cassette recorders, and set-top boxes for digital broadcasting. In the FIG. 1 embodiment, devices 112 and computer 116 preferably communicate with one another using a network bus 132. Network bus 132 preferably includes path 132(a), path 132(b), path 132(c), path 132(d), and path 132(e). For example, device B 112(b) is coupled to device A 112(a) via path 132(a), and to device E (112e) via path 132(b). Similarly, device E (112(e)) is coupled to device C 112(c) via path 132(c), and to device D 112(d) via path 132(d). In addition, device D 112(d) is coupled to computer 116 via path 132(e). In the FIG. 1 embodiment, network bus 132 is preferably implemented using an IEEE Std 1394 Standard for a High Performance Serial Bus, which is hereby incorporated by reference. However, in alternate embodiments, network 110 may readily communicate and function using various other network interconnectivity methodologies, which are equally within the scope of the present invention.

In the FIG. 1 embodiment, certain devices 112 and/or computer 116 in electronic network 10 may communicate with other devices 112 and/or computer 116 within network 110. For example, computer 116 may communicate with device B 112(b) by transmitting transfer data via cable 132(e) to device D 112(d), which may then transmit the transfer data via cable 132(d) to device E (112(e)). In response, device E 112(e) then may transmit the transfer data to device B 112(b) via cable 132(b).

Figure 2:
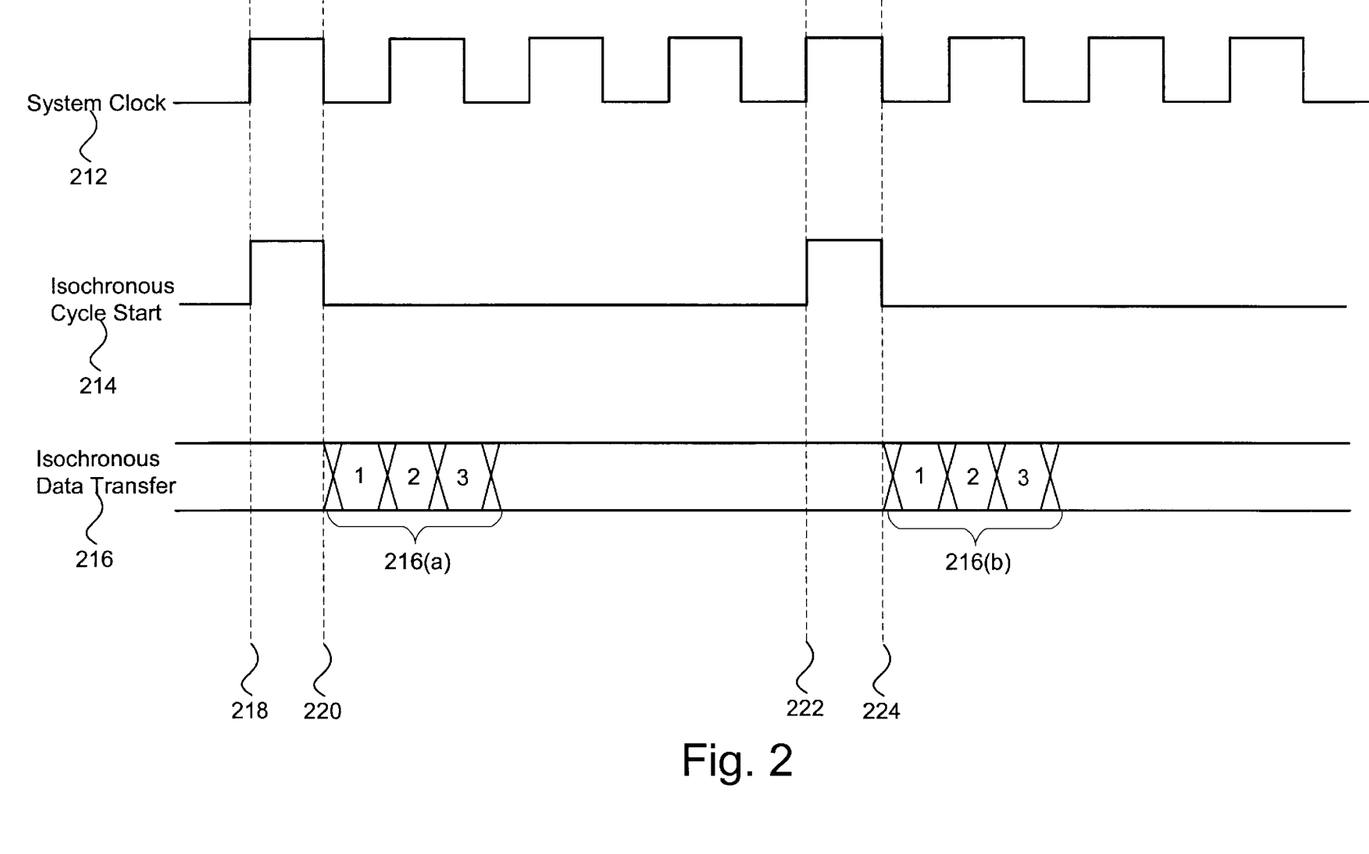
FIG. 2 is a timing diagram for one embodiment of exemplary isochronous data transfers, in accordance with the present invention.

Referring now to FIG. 2, a timing diagram for one embodiment of exemplary isochronous data transfers is shown, in accordance with one embodiment of the present invention. The FIG. 2 timing diagram includes a system clock 212, an isochronous cycle start signal 214, and an isochronous data transfer signal 216. In FIG. 2, at time 218, a first isochronous cycle start pulse changes state in synchronization with system clock 212. At time 220, the isochronous cycle start pulse changes state again, and isochronous data transfer 216(a) responsively occurs in a deterministic manner.

Similarly, at time 222, a second isochronous cycle start pulse changes state in synchronization with system clock 212. At time 224, the second isochronous cycle start pulse once more changes state, and isochronous data transfer 216(b) again occurs in a deterministic manner. Therefore, as illustrated in FIG. 2, isochronous data transfers 216(a) and 216(b) typically occur at a pre-determined time and frequency in network 110. Furthermore, network 110 may cause isochronous data transfers 216(a) and 216(b) to occur before any asynchronous data transfers because of the time-sensitive nature of isochronous data.

Figure 3:
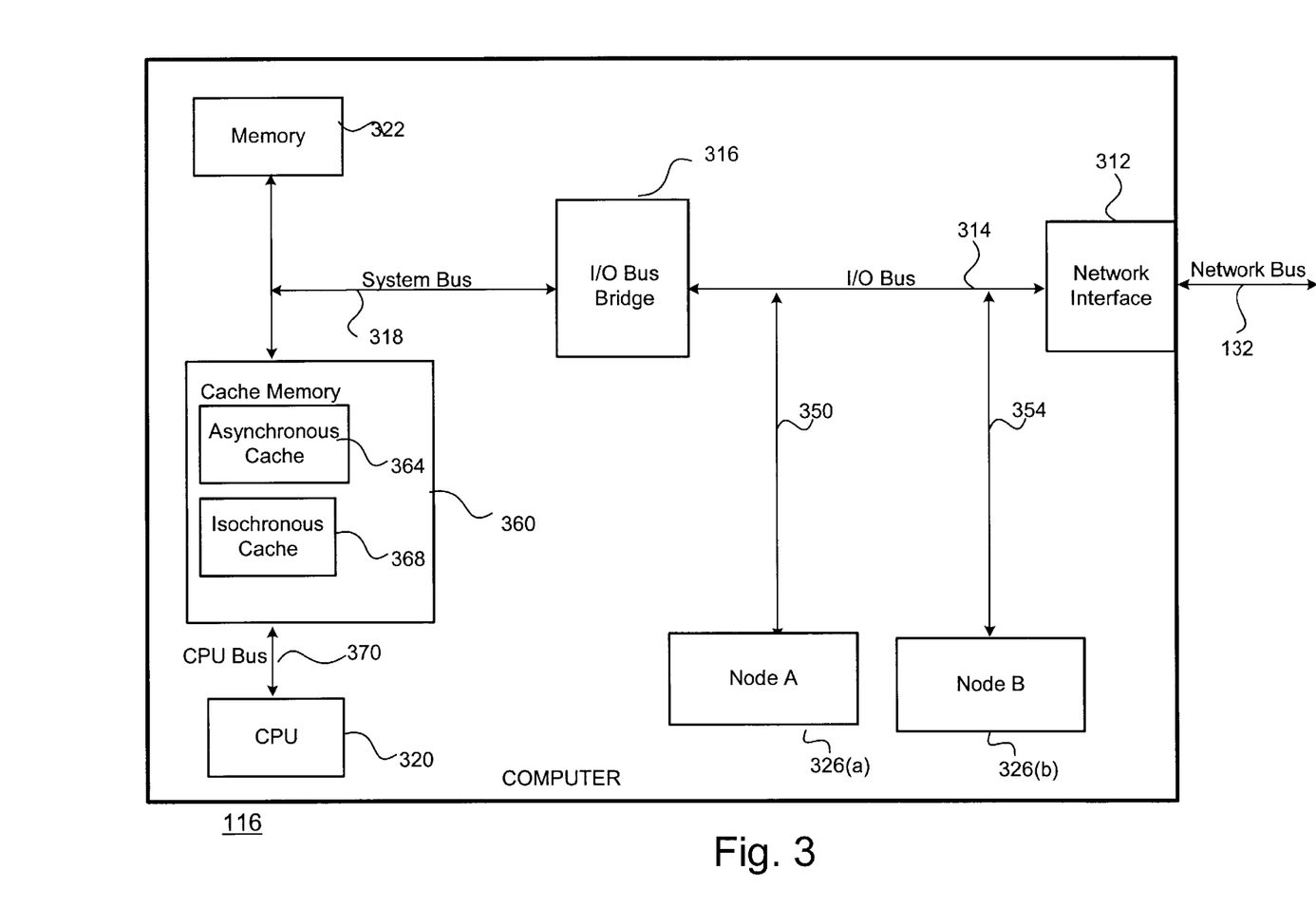
FIG. 3 is a block diagram for one embodiment of the computer of FIG. 1, in accordance with the present invention.

Referring now to FIG. 3, a block diagram for one embodiment of the FIG. 1 computer 116 is shown, in accordance with the present invention. In the FIG. 3 embodiment, computer 116 preferably includes an input/output (I/O) bus 314 for transferring various types of information and data to or from computer 116. In the FIG. 3 embodiment, I/O bus 314 is preferably implemented according to a Peripheral Component Interconnect (PCI) bus specification that is further described in "PCI Local Bus Specification," Revision 2.1s, 1995, PCI Special Interest Group, which is hereby incorporated by reference. However, in alternate embodiments, I/O bus 314 may be implemented according to any appropriate and compatible specification or standard.

In the FIG. 3 embodiment, a network interface 312 is preferably coupled to both I/O bus 314 and network bus 132 (FIG. 1) to serve as an interface for transferring isochronous data and asynchronous data between computer 116 and network 110. In addition, a node A 326(a) and a node B 326(b) are also coupled to I/O bus 314 via respective paths 350 and 354. In the FIG. 3 embodiment, node A 326(a) and/or node B 326(b) may be integral with computer 116, or, alternately, node A 326(a) and/or node B 326(b) may be external to computer 116. For purposes of illustration and clarity, the FIG. 3 computer 116 shows only two nodes 326, however, in alternate embodiments, computer 116 may include any number of input/output nodes 326.

Node A 326(a) and node B 326(b) preferably may include any desired type of interface, device, circuit, process, or node, including, for example, an ethernet interface, a printer device, a modem, or a graphics device. Furthermore, computer 116 may alternately be implemented as various other types of electronic devices including, for example, a set-top box or a digital television interface. Computer 116 also includes a central processing unit (CPU) 320, a memory 322, and a system bus 318 that is isolated from I/O bus 314 by an I/O bus bridge 316. In practice, various types of information and data are preferably transferred by computer 116 between memory 322 and I/O bus 314 via system bus 318 and I/O bus bridge 316.

In addition, computer 116 preferably includes a cache memory 360 that communicates bidirectionally with memory 322 and I/O bus bridge 316 via system bus 318, and that also communicates bidirectionally with CPU 320 via CPU bus 370. In other embodiments, cache memory 360 may be implemented in various other configurations and architectures. For example, cache memory 360 may alternately be integral with CPU 320.

In the FIG. 3 embodiment, cache memory 360 preferably includes an asynchronous cache 364 for temporarily storing asynchronous data from various sources. In accordance with the present invention, cache memory 360 also preferably includes an isochronous cache 368 that may advantageously be locked to prevent access by other types of data transfers, and that may also be flexibly reconfigured with regards to selectable attributes such as data size and the number of different isochronous processes that are supported.

In the FIG. 3 embodiment, CPU 320 operates at a high rate of speed in relation to memory 322 which is typically relatively slow by comparison. The slower speed of memory 322 may often restrict the response time with which CPU 320 can complete various processing tasks when CPU 320 requires information from memory 322 to perform the particular task. Cache memory 360 preferably operates at relatively high speed that is comparable to the speed of CPU 320. Computer 116 may therefore advantageously preload cache memory 360 with appropriate data and instructions that are needed by CPU 320 to perform various processing operations to thereby expedite a given processing task.

As discussed above, isochronous data typically is time-sensitive data that is assigned a high transfer and processing priority to guarantee that the isochronous data deterministically arrives at pre-determined timing intervals and is processed accordingly. Because of the time-sensitive nature of isochronous data, re-transmission of an isochronous data transfer may not be appropriate or possible. For example, if a frame of video data does not reach a display device on network 110 until after the appropriate moment for display of that frame, then re-transmitting the delayed frame is not productive. Sources of isochronous data therefore typically do not repeat unsuccessful isochronous data transmissions. Loss of the foregoing frame of video data may likely cause unwanted jitter or breakup of the corresponding video programming.

Therefore, ensuring the timely and guaranteed arrival of isochronous data at CPU 320 becomes a matter of some importance when implementing network 110. Computer 116 may therefore flexibly reserve a re-configurable portion of cache memory 360 as isochronous cache 368 to ensure deterministic performance of isochronous processes, in accordance with the present invention. This method for ensuring timely completion of isochronous data transfers to facilitate processor operations is further discussed below in conjunction with FIGS. 4 through 10.

Figure 4:
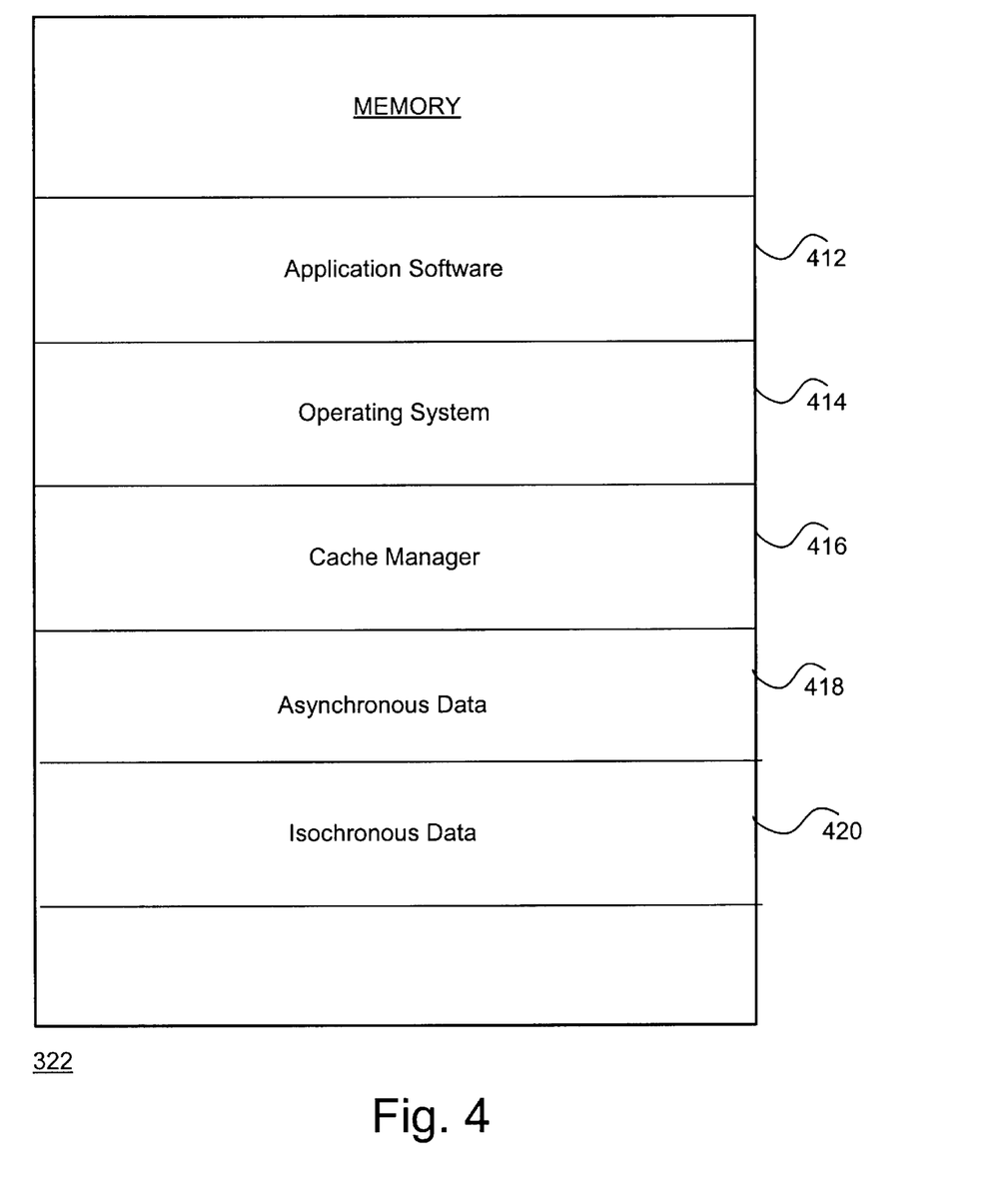
FIG. 4 is a block diagram for one embodiment of the memory of FIG. 3, in accordance with the present invention.

Referring now to FIG. 4, a block diagram for one embodiment of the FIG. 3 memory 322 is shown, in accordance with the present invention. In the FIG. 4 embodiment, memory 322 preferably includes, but is not limited to, application software 412, an operating system 414, a cache manager 416, asynchronous data 418, and isochronous data 420. In alternate embodiments, memory 322 may readily include various other components in addition to, or instead of, the components that are discussed in conjunction with the FIG. 4 embodiment.

In the FIG. 4 embodiment, application software 412 includes software instructions that are preferably executed by CPU 320 (FIG. 3) for performing various functions and operations by computer 116. The particular nature and functionality of application software 412 preferably varies depending upon factors such as the type and purpose of the corresponding host device 116. Application software 412 may include various instructions that cause CPU 320 to transfer portions of asynchronous data 418 or isochronous data 420 bi-directionally between memory 322 and CPU 320 via cache memory 360, in accordance with the present invention.

In the FIG. 4 embodiment, operating system 414 preferably controls and coordinates low-level functionality of device 116. Cache manager 416 preferably manages the scheduling and execution of various processes and functions for device 116, and may be integral with, or separate from, operating system 414. The functionality and operation of cache manager 416 is further discussed below in conjunction with FIGS. 5 through 10.

Figure 5:
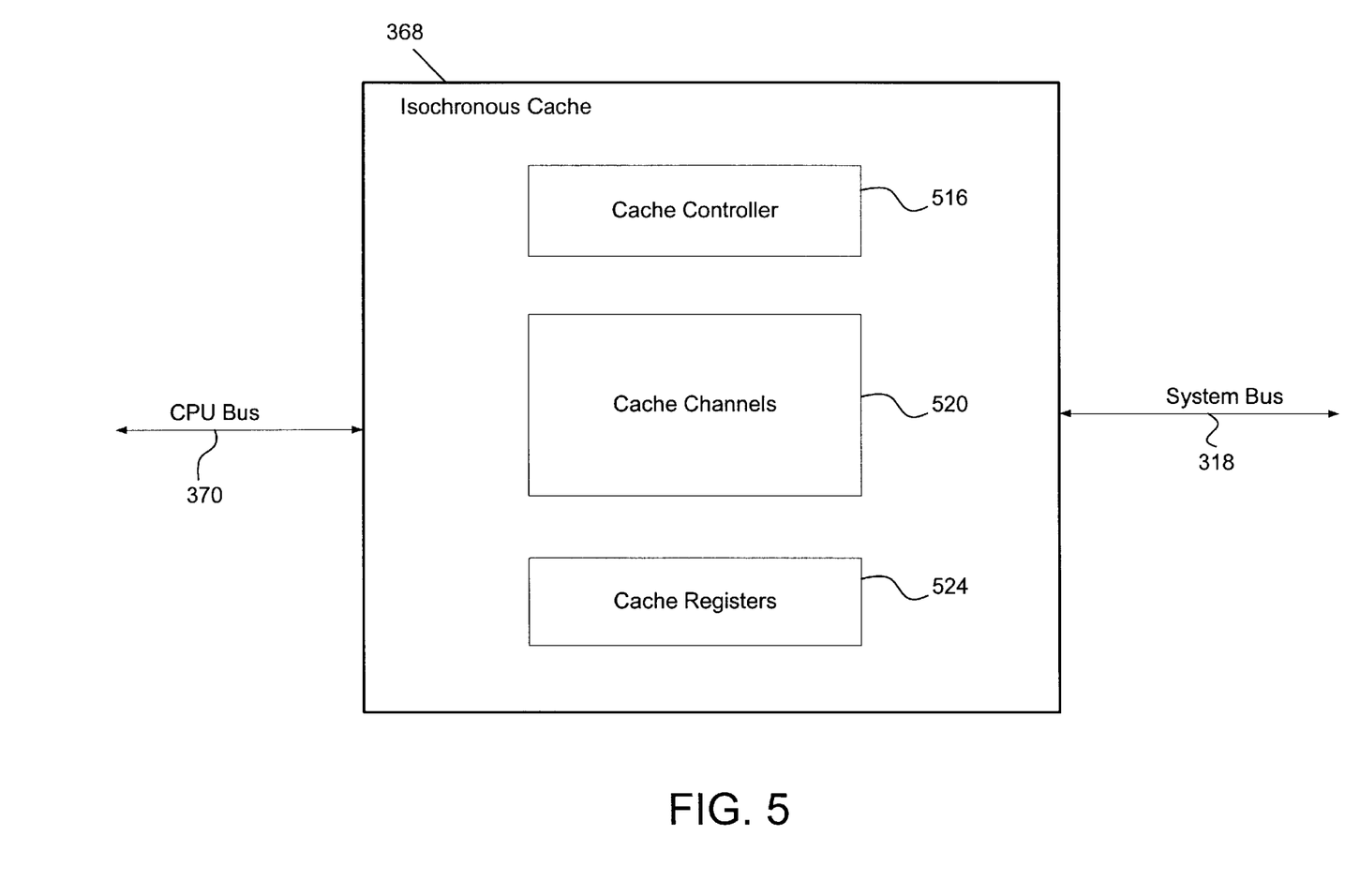
FIG. 5 is a block diagram for one embodiment of the isochronous cache of FIG. 3, in accordance with the present invention.

Referring now to FIG. 5, a block diagram for one embodiment of the FIG. 3 isochronous cache 368 is shown, in accordance with the present invention. In the FIG. 5 embodiment, isochronous cache 368 preferably includes, but is not limited to, a cache controller 516, cache channels 520, and cache registers 524. In alternate embodiments, isochronous cache 368 may readily include various other components in addition to, or instead of, the components that are discussed in conjunction with the FIG. 5 embodiment.

In the FIG. 5 embodiment, cache controller 516 preferably performs many of the control functions for isochronous cache 368. For example, cache controller 516 may flexibly reconfigure memory channels (cache channels 520) in isochronous cache 368 in response to the requirements of various isochronous process requests. Cache channels 520 may include any appropriate configuration of memory that is coupled to computer 116. The authorization, setup, and configuration of cache channels 520 is further discussed below in conjunction with FIGS. 6 through 8.

In addition, cache controller 516 may also effectively coordinate and control the movement of information both in and out of cache channels 520. In the FIG. 5 embodiment, cache controller 516 may send or receive information via system bus 318, as discussed below in conjunction with FIG. 9. Furthermore, cache controller 516 may also send or receive information via CPU bus 370, as discussed below in conjunction with FIG. 10.

In the FIG. 5 embodiment, cache registers 524 preferably include various information for managing and controlling isochronous cache 368. The configuration and utilization of cache registers 524 is further discussed below in conjunction with FIGS. 6 through 10.

Figure 6:
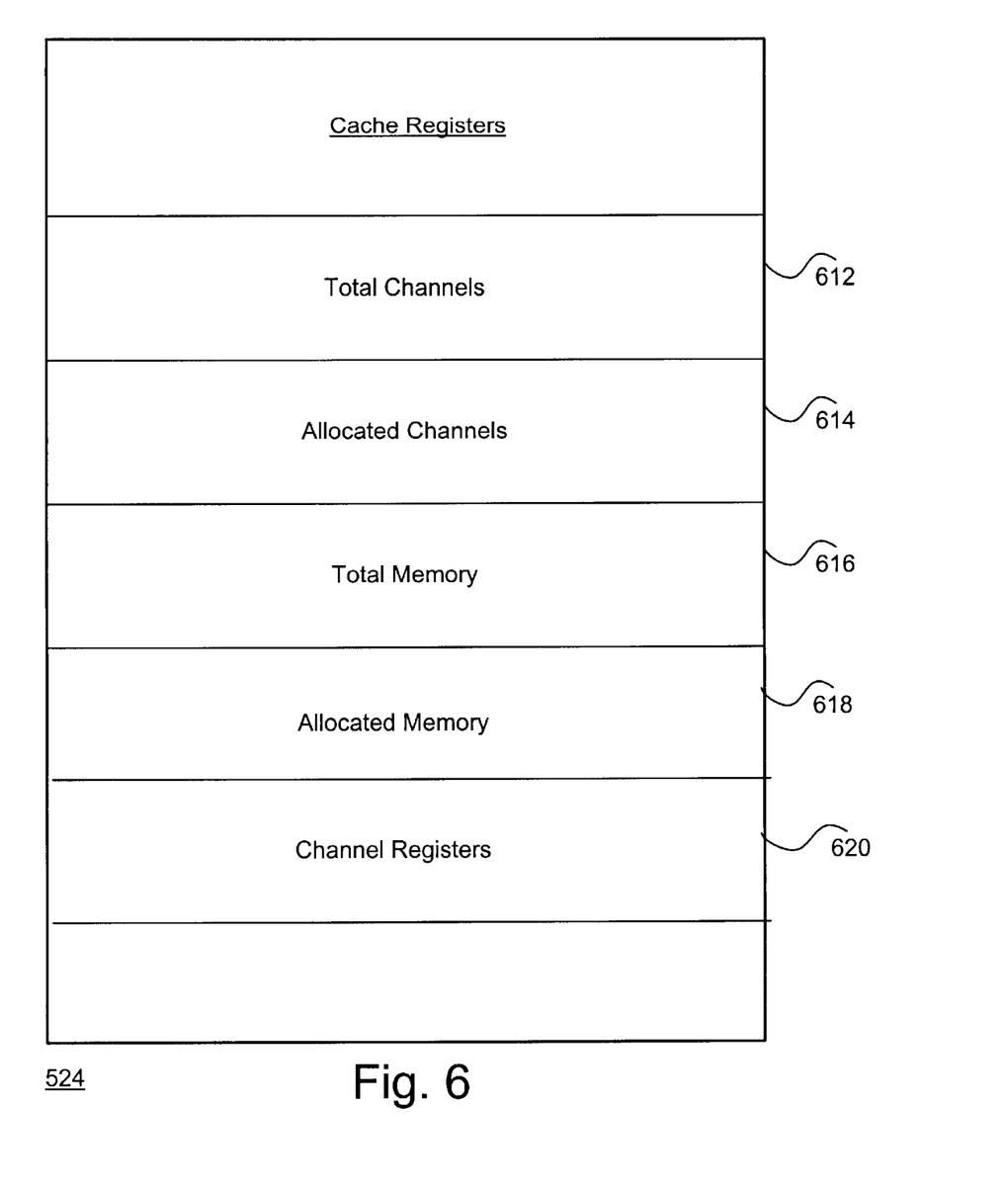
FIG. 6 is a block diagram for one embodiment of the cache registers of FIG. 5, in accordance with the present invention.

Referring now to FIG. 6, a block diagram for one embodiment of the FIG. 5 cache registers 524 is shown, in accordance with the present invention. In alternate embodiments, cache registers 524 may readily include various other components in addition to, or instead of, the components that are discussed in conjunction with the FIG. 6 embodiment.

In the FIG. 6 embodiment, cache registers 524 are preferably maintained, updated, and controlled by cache manager 416 (FIG. 4) to indicate the current status of isochronous cache 368. For example, cache registers 524 may be utilized to determine the current number of cache channels 520 in isochronous cache 368, or to determine the amount of memory available in isochronous cache 368. Therefore, cache manager 416 preferably updates cache registers 524 whenever isochronous cache is reconfigured to accommodate a new or different isochronous process.

In the FIG. 6 embodiment, a total channels field 612 preferably indicates the total number of isochronous memory channels that isochronous cache 368 is designed to support. An allocated channels field 614 preferably indicates the number of isochronous memory channels (cache channels 520) that are currently allocated for use by active isochronous processes. Any interested entity may thus determine whether any available isochronous cache channels exist by subtracting the allocated channels field 614 from the total channels field 612.

In the FIG. 6 embodiment, a total memory field 616 preferably indicates the total amount of isochronous memory that isochronous cache 368 may utilize. An allocated memory field 618 preferably indicates the amount of isochronous memory (in cache channels 520) that is currently allocated for use by active isochronous processes. Any interested entity may thus determine whether any available isochronous cache memory space exists by subtracting the allocated memory field 618 from the total memory field 616.

In the FIG. 6 embodiment, channel registers 620 preferably include a series of individual registers that each correspond to a particular cache channel 520, as well as to a particular isochronous process. The configuration and functionality of channel registers 620 is further discussed below in conjunction with FIG. 7.

Figure 7:
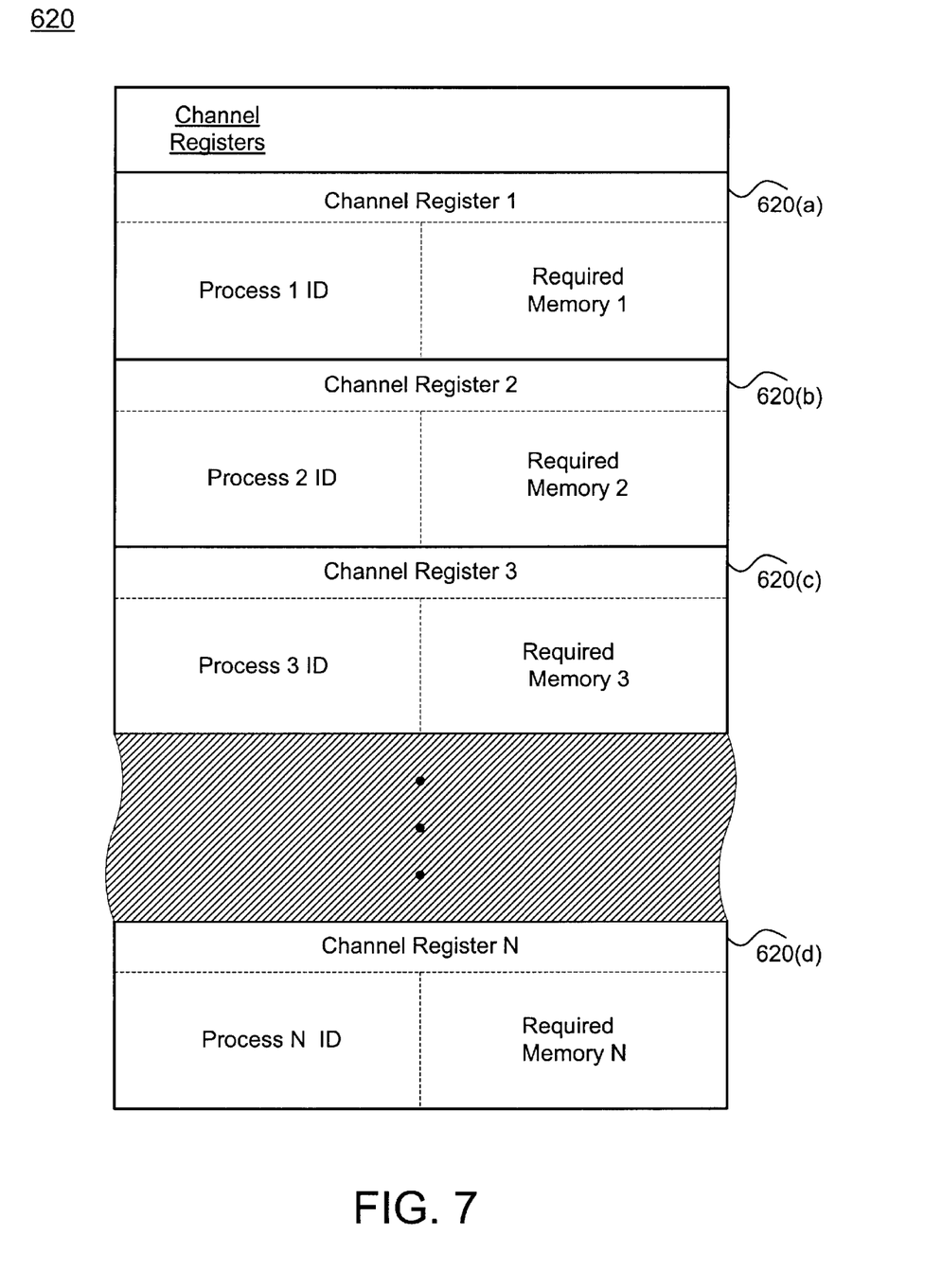
FIG. 7 is a block diagram for one embodiment of the channel registers of FIG. 6, in accordance with the present invention.

Referring now to FIG. 7, a block diagram for one embodiment of the FIG. 6 channel registers 620 is shown, in accordance with the present invention. In the FIG. 7 embodiment, channel registers 620 preferably include a channel register 1 (620(a)) through a channel register N (620(d)). In alternate embodiments, channel registers 620 may readily include various other components in addition to, or instead of, the components that are discussed in conjunction with the FIG. 7 embodiment. For example, channel registers 620 may include such fields as an active channel field that indicates whether a channel is currently allocated for active use, a packet number field that indicates the number of packets in a given channel, an error control field that includes relevant error information, and a security field that includes information for use in supporting device security functionality for computer 116.

In the FIG. 7 embodiment, each channel register 620 preferably includes a separate process identifier (process ID) field and a required memory field. The process ID field preferably includes a unique identifier that corresponds to the associated isochronous process for which a particular cache channel 520 is allocated to store information. The required memory field preferably includes information to designate the amount of memory space (in isochronous cache 368) that is required to perform the associated isochronous process. Any interested entity may thus reference channel registers 620 to identify a particular isochronous process or determine the amount of isochronous cache memory required for that isochronous process.

Figure 8:
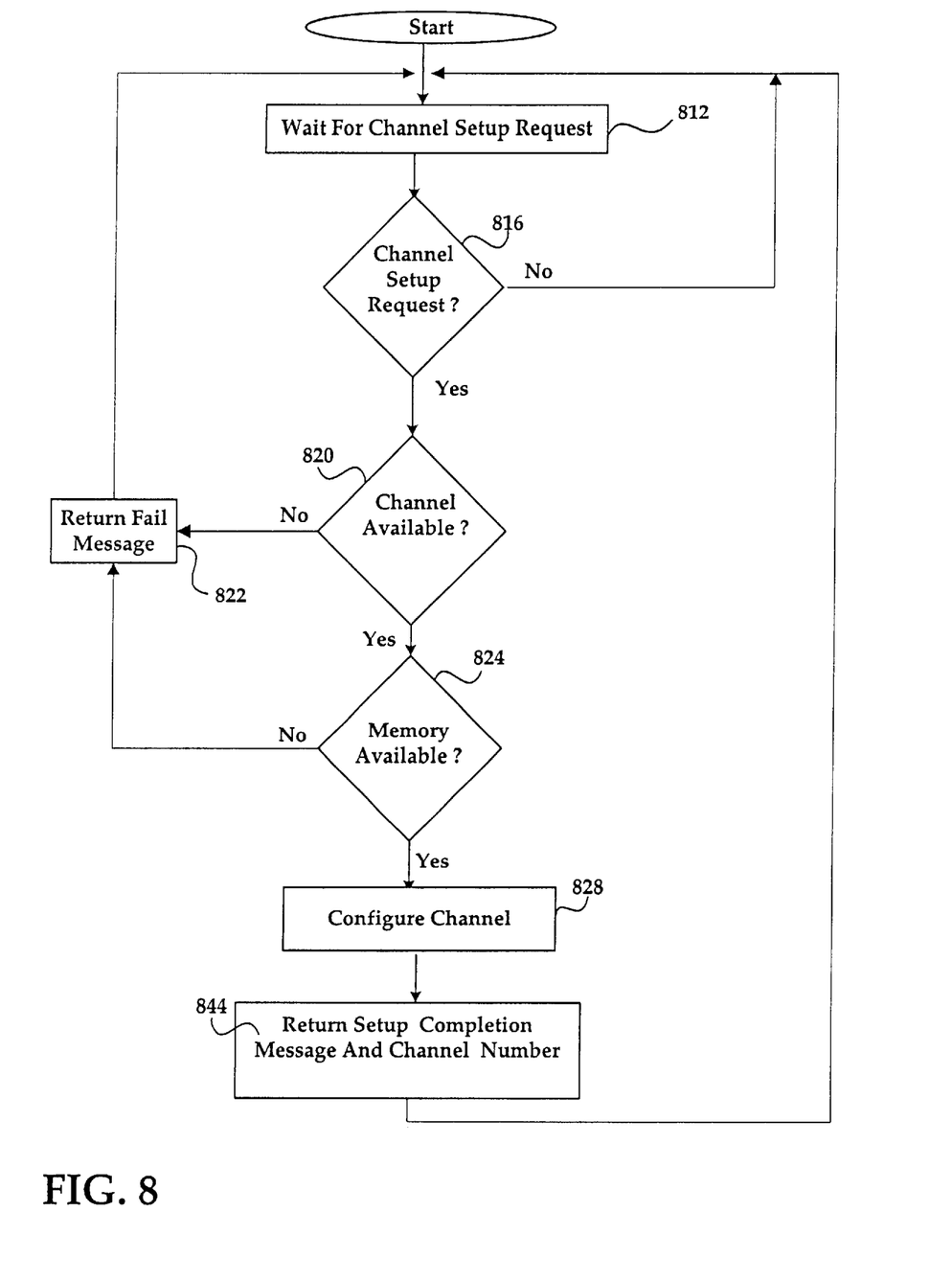
FIG. 8 is a flowchart of method steps for performing a cache channel setup procedure, in accordance with one embodiment of the present invention.

Referring now to FIG. 8, a flowchart of method steps for performing a cache channel setup procedure is shown, in accordance with one embodiment of the present invention. In alternate embodiments, the present invention may similarly utilize various other steps in differing sequences to optimize processor operations, in accordance with the present invention.

In the FIG. 8 embodiment, initially, in steps 812 and 816, cache manager 416 preferably waits for a channel setup request from a requesting entity. For example, application software 412 or operating system 414 may seek, by means of CPU 320, to initiate a new isochronous process that requires an additional cache channel 520 in isochronous cache 368. In certain embodiments, the foregoing channel setup request may include various relevant information. For example, the channel setup request may include a data transfer size, an isochronous process identifier, a transmission bus channel number (from I/O bus 314 and/or network bus 132) for mapping to a corresponding isochronous cache channel number in cache channels 520, and a transfer direction indicator.

If cache manager 416 receives a channel setup request in step 816, then, in step 820, cache manager 416 begins a channel allocation procedure, and preferably determines whether an additional cache channel 520 is available by analyzing cache registers 524, as discussed above in conjunction with FIG. 6. If no additional cache channels 520 are available, then, in step 822, cache manager 416 preferably returns a fail message to the requesting entity, and the FIG. 8 process returns to step 812 to wait for another channel setup request.

However, if an additional cache channel 520 is available, then, in step 824, cache manager 416 determines whether sufficient memory space is available in isochronous cache 368 by analyzing cache registers 524, as discussed above in conjunction with FIG. 6. If insufficient memory space is available in isochronous cache 368, then, in step 822, cache manager 416 preferably returns a fail message to the requesting entity, and the FIG. 8 process returns to step 812 to wait for a new channel setup request.

However, if sufficient memory space is available in isochronous cache 368, then, in step 828, cache manager 416 provides a channel authorization signal to cache controller 516 which responsively configures an additional channel in cache channels 520 to service the new isochronous process. Finally, in step 844, cache manager 416 preferably returns a setup completion message and a channel number for the newly-configured cache channel 520 to the requesting entity. Cache manager 416 also preferably updates channel registers 620 to account for the additional cache channel 520, and the FIG. 8 process terminates.

Figure 9:
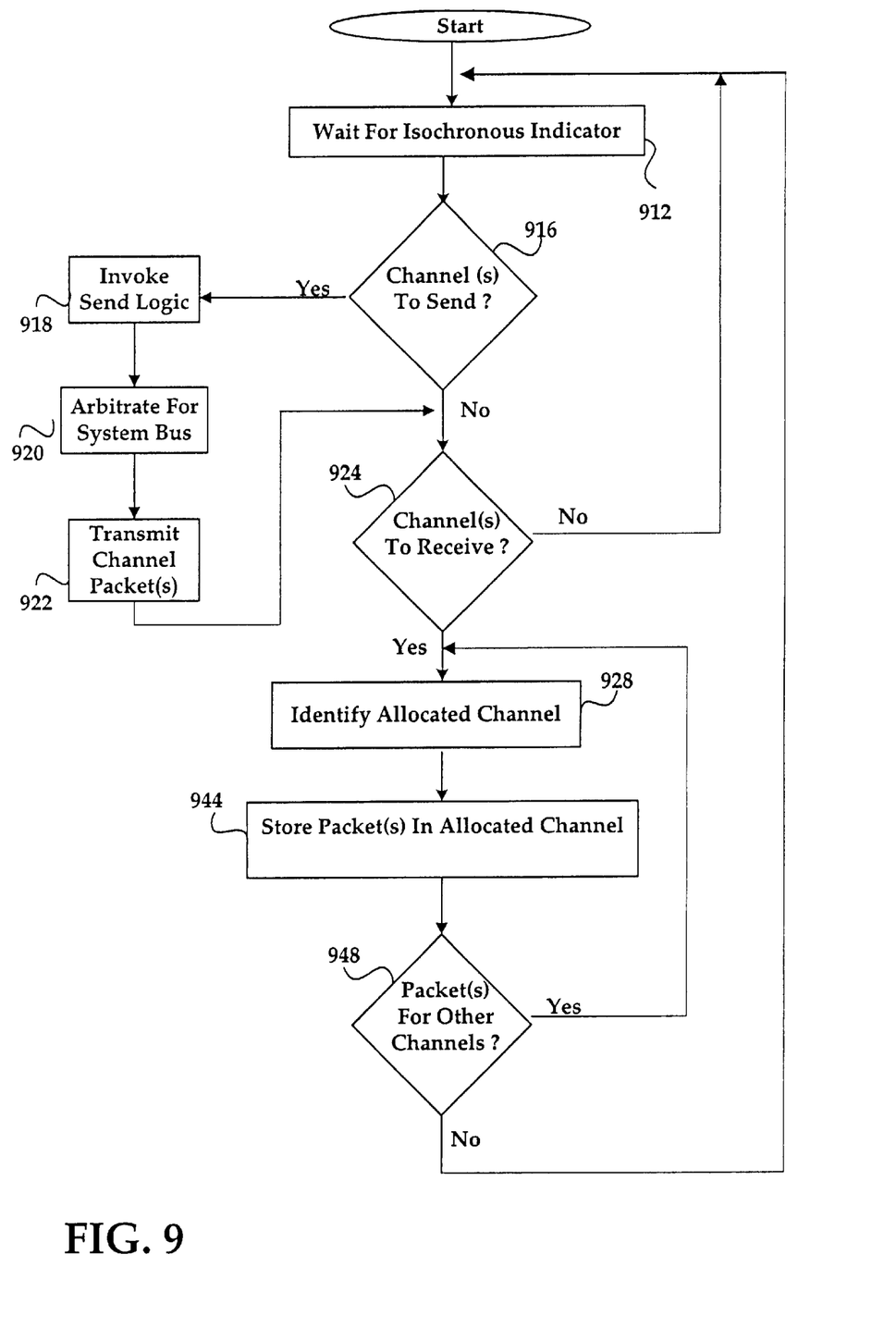
FIG. 9 is a flowchart of method steps for performing a system-bus data transfer operation, in accordance with one embodiment of the present invention.

Referring now to FIG. 9, a flowchart of method steps for performing a data transfer operation over system bus 318 is shown, in accordance with one embodiment of the present invention. In alternate embodiments, the present invention may similarly utilize various other steps in differing sequences to optimize processor operations, in accordance with the present invention.

In the FIG. 9 embodiment, initially, in step 912, cache controller 516 preferably monitors system bus 318 for any transmissions that may include an isochronous indicator to signify an isochronous process that requires high-priority handling. In certain embodiments, isochronous packets that are transmitted on system bus 318 may include a channel number to identify an appropriate corresponding cache channel 520 in isochronous cache 368. In step 916, in response to detecting an isochronous indicator in prior step 912, cache controller 516 then determines whether there are any cache channels 520 to send from isochronous cache 368 over system bus 318.

If there are cache channels 520 to send from isochronous cache 368 over system bus 318, then, in step 918, cache controller 516 invokes send logic which, in step 920, arbitrates for control of system bus 318, and then, in step 922, transmits the appropriate cache channels 420 from isochronous cache 368 over system bus 318.

However, in foregoing step 916, if there are no cache channels 520 to send from isochronous cache 368, then, in step 924, cache controller 516 preferably determines whether there are any packets or other information to receive over system bus 318 for storage into cache channels 520 of isochronous cache 368. If there is nothing to receive over system bus 318 for storage into cache channels 520, then the FIG. 9 process returns to step 912 to wait for another isochronous indicator.

In step 928, if there is anything for storage into cache channels 520, then cache controller 516 preferably identifies the allocated cache channel 520 for the particular isochronous transmission by referencing relevant information previously provided in the channel setup request (see step 812 of FIG. 8). For example, cache controller may reference the previously-provided transmission bus channel number for mapping to a corresponding isochronous cache channel number in cache channels 520.

Then, in step 944, cache controller 516 preferably stores the packets transmitted over system bus 318 into the appropriate allocated cache channel 520. In step 948, cache controller 516 preferably determines whether there are any further transmissions over system bus 318 for storage into isochronous cache 368. If there are any further transmissions over system bus 318 for storage into isochronous cache 368, then the FIG. 9 process returns to step 928 to repeat the storage process for isochronous cache 516. However, if there are no further transmissions over system bus 318 for storage into isochronous cache 368, then the FIG. 9 process returns to step 912 to wait for another isochronous indicator.

Figure 10:
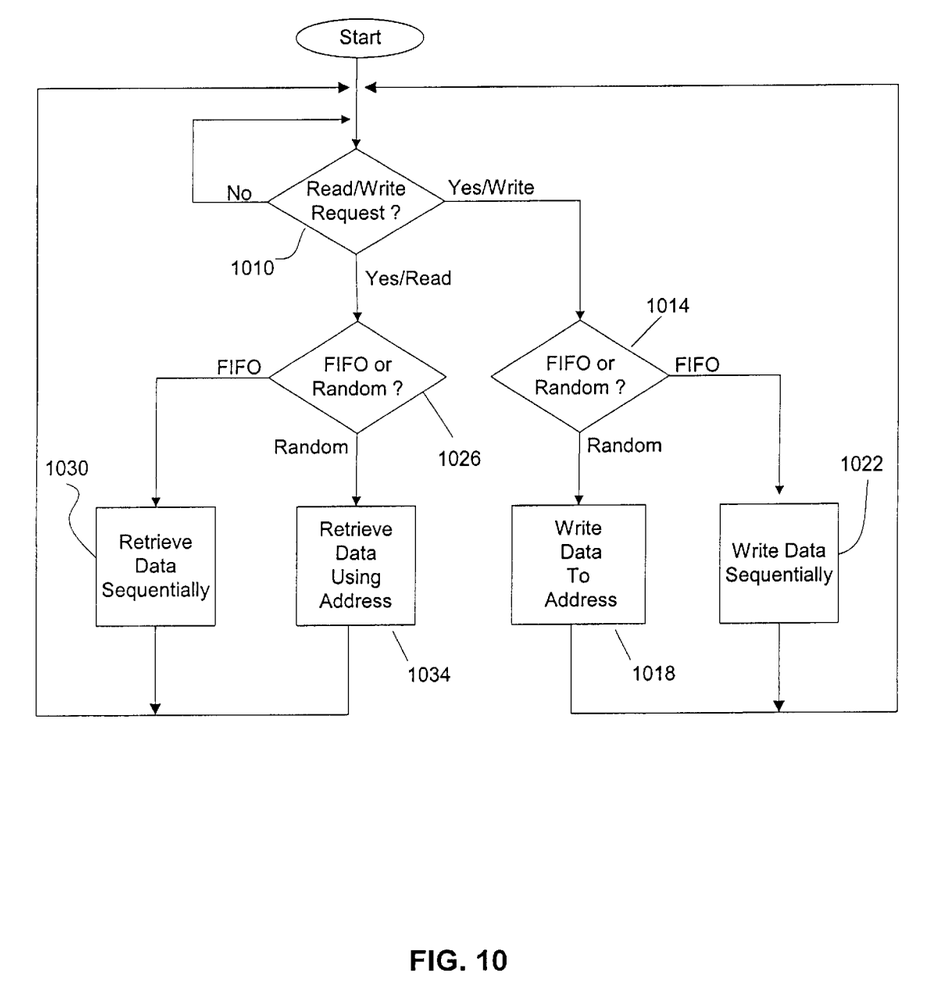
FIG. 10 is a flowchart of method steps for performing a CPU-bus data transfer operation, in accordance with one embodiment of the present invention.

Referring now to FIG. 10, a flowchart of method steps for performing a data transfer operation over CPU bus 370 is shown, in accordance with one embodiment of the present invention. In alternate embodiments, the present invention may similarly utilize various other steps in differing sequences to optimize processor operations, in accordance with the present invention.

In the FIG. 10 embodiment, initially, in step 1010, cache controller 516 determines whether either a read request or a write request has been received from a requesting entity (such as application software 412) to transfer isochronous information to or from a cache channel 520 in isochronous cache 368 via CPU bus 370.

If a read request has been received, then, in step 1026, cache controller 516 determines whether the requested isochronous read operation is a first-in-first-out (FIFO) read operation or a random-access read operation. Cache controller 516 may determine the type of read operation using any appropriate method. For example, the associated read request may specify a read operation type by including a "mode" bit, or the type of isochronous process may require a certain type of read operation for successful performance.

If the isochronous read operation is a FIFO read operation, then, in step 1030, cache controller 516 sequentially retrieves data from the appropriate cache channel 520 beginning with the first data stored and ending with the last data stored in the cache channel 520. The FIG. 10 process then returns to step 1010 to wait for another read request or a write request. However, if the isochronous read operation is a random-access read operation, then, in step 1034, cache controller 516 retrieves data from the appropriate cache channel 520 using a specific address to identify a memory location in the cache channel 520. The FIG. 10 process then returns to step 1010 to wait for a read request or a write request.

In foregoing step 1010, if a write request has been received, then, in step 1014, cache controller 516 determines whether the requested isochronous write operation is a first-in-first-out (FIFO) write operation or a random-access write operation. Cache controller 516 may determine the type of write operation using any appropriate method. For example, the associated write request may specify a write operation type by including a "mode" bit, or the type of isochronous process may require a certain type of write operation for successful performance.

If the isochronous write operation is a FIFO write operation, then, in step 1022, cache controller 516 writes data into the appropriate cache channel 520 in a sequential manner. The FIG. 10 process then returns to step 1010 to wait for a read request or a write request. However, if the isochronous write operation is a random-access write operation, then, in step 1018, cache controller 516 preferably writes data into the appropriate cache channel 520 at a specific address that corresponds to a memory location in the cache channel 520. The FIG. 10 process then returns to step 1010 to wait for a read request or a write request.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for optimizing processor operations, comprising:

a transmission source configured to provide priority information for use by an electronic device;

a cache memory coupled to said transmission source and configured for temporarily storing said priority information, said cache memory including an isochronous cache that is reserved for storing only said isochronous data on a priority basis, said cache memory also including an asynchronous cache that is configured to store asynchronous data on a non-priority basis, said asynchronous cache being selectably sized to ensure sufficient storage space in said cache memory for implementing said isochronous cache to store said isochronous data; and     a processor coupled to said cache memory for utilizing said priority information from said cache memory.

2. The system of claim 1 wherein said priority information includes isochronous data for performing a time-sensitive isochronous process.

3. A system for optimizing processor operations, comprising:

a transmission source configured to provide priority information for use by an electronic device, said priority information including isochronous data for performing a time-sensitive isochronous process;

a cache memory coupled to said transmission source and configured for temporarily storing said priority information, said cache memory including an isochronous cache that is reserved for storing only said isochronous data on a priority basis, said cache memory also including an asynchronous cache that is configured to store asynchronous data on a non-priority basis, said isochronous cache including a cache controller, one or more cache channels, and cache registers, said asynchronous cache being selectably sized to ensure sufficient storage space in said cache memory for implementing said cache channels to store said isochronous data; and a processor coupled to said cache memory for utilizing said priority information from said cache memory.

4. The system of claim 3 wherein said cache memory and said processor are coupled to one of a computer device, a set-top box, a digital television device, and a consumer electronic device, said transmission source including one of a random-access memory, a read-only memory, or an audio-video device, said electronic device being part of an electronic network that is implemented according to an IEEE 1394 serial bus interconnectivity standard.

5. The system of claim 3 wherein said isochronous cache is inaccessible to all non-isochronous processes for storing non-isochronous data, said isochronous cache being reconfigurable by a cache manager and a cache controller into separate cache channels that each correspond to a different respective isochronous process.

6. The system of claim 3 wherein said cache registers include a total channels field, an allocated channels field, a total memory field, an allocated memory field, and one or more channel registers, said channel registers including a process identifier field and a required memory field.

7. The system of claim 6 wherein a cache manager initiates a channel setup procedure after receiving a channel setup request from a requesting entity to configure a new cache channel for an isochronous process, said channel setup request including a data transfer size, an isochronous process identifier, a transmission bus channel number for mapping to a corresponding isochronous cache channel number, and a transfer direction indicator, said cache manager allocating said new cache channel only after determining that said new cache channel is available by analyzing said total channels field and said allocated channels field in said cache registers.

8. The system of claim 6 wherein a cache manager allocates said new cache channel only after determining that a sufficient memory space is available for said new cache channel by analyzing said total memory field and said allocated memory field in said cache registers, and said required memory field in a corresponding channel register, said cache manager transmitting a new channel allocation message to said cache controller, said cache controller responsively reconfiguring said isochronous cache to include said new cache channel, said cache manager returning a setup completion message and a cache channel number to said requesting entity, said cache manager also updating said cache registers to account for said new cache channel.

9. The system of claim 3 wherein said cache controller begins a data transfer operation by detecting an isochronous indicator, said cache controller determining that said data transfer operation is a send operation, responsively invoking send logic that arbitrates for access to said system bus, and then transmitting said isochronous data from said isochronous cache onto said system bus, or said cache controller alternately determining that said data transfer operation is a receive operation, responsively utilizing a mapping technique to identify an allocated cache channel in said isochronous cache, and then transferring said isochronous data from said system bus into said allocated isochronous channel.

10. The system of claim 3 wherein said processor begins a data transfer operation over a CPU bus coupled to said cache memory by sending a data transfer request to said cache controller in said isochronous cache, said data transfer request including a mode bit to indicate one of a FIFO mode and a random-access mode, said processor performing a read operation from said isochronous cache, said read operation being performed sequentially in said FIFO mode, said read operation being performed using a memory location address in said random-access mode, or said processor alternately performing a write operation to said isochronous cache, said write operation being performed sequentially in said FIFO mode, said write operation being performed using a memory location address in said random-access mode.

11. A method for optimizing processor operations, comprising the steps of:

providing priority information from a transmission source for use by an electronic device;

configuring a cache memory to store said priority information, said cache memory including an isochronous cache that is reserved for storing only said isochronous data on a priority basis, said cache memory also including an asynchronous cache that is configured to store asynchronous data on a non-priority basis, said asynchronous cache being selectably sized to ensure sufficient storage space in said cache memory for implementing said isochronous cache to store said isochronous data; and accessing said priority information from said cache memory by using a processor.

12. The method of claim 11 wherein said priority information includes isochronous data for performing a time-sensitive isochronous process.

13. A method for optimizing processor operations, comprising the steps of:

providing priority information from a transmission source for use by an electronic device, said priority information including isochronous data for performing a time-sensitive isochronous process;

configuring a cache memory to store said priority information, said cache memory including an isochronous cache that is reserved for storing only said isochronous data on a priority basis, said cache memory also including an asynchronous cache that is configured to store asynchronous data on a non-priority basis, said isochronous cache including a cache controller, one or more cache channels, and cache registers, said asynchronous cache being selectably sized to ensure sufficient storage space in said cache memory for implementing said cache channels to store said isochronous data; and accessing said priority information from said cache memory by using a processor.

14. The method of claim 13 wherein said cache memory and said processor are coupled to one of a computer device, a set-top box, a digital television device, and a consumer electronic device, said transmission source including one of a random-access memory, a read-only memory, or an audio-video device, said electronic device being part of an electronic network that is implemented according to an IEEE 1394 serial bus interconnectivity standard.

15. The method of claim 13 wherein said isochronous cache is inaccessible to all non-isochronous processes for storing non-isochronous data, said isochronous cache being reconfigurable by a cache manager and a cache controller into separate cache channels that each correspond to a different respective isochronous process.

16. The method of claim 13 wherein said cache registers include a total channels field, an allocated channels field, a total memory field, an allocated memory field, and one or more channel registers, said channel registers including a process identifier field and a required memory field.

17. The method of claim 16 wherein a cache manager initiates a channel setup procedure after receiving a channel setup request from a requesting entity to configure a new cache channel for an isochronous process, said channel setup request including a data transfer size, an isochronous process identifier, a transmission bus channel number for mapping to a corresponding isochronous cache channel number, and a transfer direction indicator, said cache manager allocating said new cache channel only after determining that said new cache channel is available by analyzing said total channels field and said allocated channels field in said cache registers.

18. The method of claim 16 wherein a cache manager allocates said new cache channel only after determining that a sufficient memory space is available for said new cache channel by analyzing said total memory field and said allocated memory field in said cache registers, and said required memory field in a corresponding channel register, said cache manager transmitting a new channel allocation message to said cache controller, said cache controller responsively reconfiguring said isochronous cache to include said new cache channel, said cache manager returning a setup completion message and a cache channel number to said requesting entity, said cache manager also updating said cache registers to account for said new cache channel.

19. The method of claim 13 wherein said cache controller begins a data transfer operation by detecting an isochronous indicator, said cache controller determining that said data transfer operation is a send operation, responsively invoking send logic that arbitrates for access to said system bus, and then transmitting said isochronous data from said isochronous cache onto said system bus, or said cache controller alternately determining that said data transfer operation is a receive operation, responsively utilizing a mapping technique to identify an allocated cache channel in said isochronous cache, and then transferring said isochronous data from said system bus into said allocated isochronous channel.

20. The method of claim 13 wherein said processor begins a data transfer operation over a CPU bus coupled to said cache memory by sending a data transfer request to said cache controller in said isochronous cache, said data transfer request including a mode bit to indicate one of a FIFO mode and a random-access mode, said processor performing a read operation from said isochronous cache, said read operation being performed sequentially in said FIFO mode, said read operation being performed using a memory location address in said random-access mode, or said processor alternately performing a write operation to said isochronous cache, said write operation being performed sequentially in said FIFO mode, said write operation being performed using a memory location address in said random-access mode.

21. A computer-readable medium comprising program instructions for optimizing processor operations by performing the steps of:
  providing priority information from a transmission source for use by an electronic device;
  configuring a cache memory to store said priority information, said cache memory including an isochronous cache that is reserved for storing only said isochronous data on a priority basis, said cache memory also including an asynchronous cache that is configured to store asynchronous data on a non-priority basis, said asynchronous cache being selectably sized to ensure sufficient storage space in said cache memory for implementing said isochronous cache to store said isochronous data; and
  accessing said priority information from said cache memory by using a processor.

* * * * *